US005765121A

United States Patent [19]

Schwager et al.

[11] Patent Number: 5,765,121

[45] Date of Patent: Jun. 9, 1998

[54] FUEL SLOSHING DETECTION

[75] Inventors: Bryce Andrew Schwager, Ypsilanti; Patrick Joseph Curran, Farmington Hills, both of Mich.

[73] Assignee: Ford Global Technologies, Inc., Dearborn, Mich.

[21] Appl. No.: 707,550

[22] Filed: Sep. 4, 1996

[51] Int. Cl.[6] .............................. G01M 15/00

[52] U.S. Cl. .............................. 701/104; 701/107; 701/112; 73/118.1

[58] Field of Search .............................. 701/104, 107, 701/112; 73/116, 117.2, 117.3, 118.1, 118.2, 49.7

[56] References Cited

U.S. PATENT DOCUMENTS

| | | | |
|---|---|---|---|
| 5,463,998 | 11/1995 | Denz et al. | 123/520 |
| 5,467,641 | 11/1995 | Williams et al. | 73/49.7 |
| 5,490,414 | 2/1996 | Durschmidt et al. | 73/118.1 |
| 5,495,749 | 3/1996 | Dawson et al. | 73/118.1 |
| 5,526,675 | 6/1996 | Ratton | 73/118.1 |
| 5,560,346 | 10/1996 | Isobe et al. | 123/519 |
| 5,606,121 | 2/1997 | Blomquist et al. | 73/118.1 |
| 5,614,665 | 3/1997 | Curran et al. | 73/118.1 |
| 5,616,836 | 4/1997 | Blomquist et al. | 73/118.1 |
| 5,629,477 | 5/1997 | Ito | 73/118.1 |

*Primary Examiner*—George M. Dombroske
*Attorney, Agent, or Firm*—Allan J. Lippa; Roger L. May

[57] ABSTRACT

An onboard diagnostic mechanism for a sealed vehicle fuel delivery system. By controlling fuel system valves, the electronic engine controller (EEC) periodically subjects the sealed system to an initial vacuum level, then monitors the pressure increase due to evaporative effects during a predetermined test interval. Excessive deviations in measured pressure compared to predetermined criteria produce indications of potential undesired operational conditions. To prevent fuel sloshing which results from aggressive driving or rough roads from producing false output indications, the instantaneous system pressure is compared with a rolling average of tank pressure to produce a difference signal indicative of fuel sloshing. If the resulting difference signal exceeds a predetermined threshold, the monitoring process is aborted in favor of a later test after the fuel sloshing condition terminates.

10 Claims, 2 Drawing Sheets

FUEL SLOSHING DETECTION

FIELD OF THE INVENTION

This invention relates to electronic vehicle diagnostic systems and more particularly to an arrangement for verifying the operation of a closed fuel delivery system.

BACKGROUND OF THE INVENTION

In order to test the operation of a vehicle's sealed fuel supply system, on board diagnostic methods have been developed. In one preferred scheme, the system's pressure control valves are periodically operated under the control of the vehicle's electronic engine control (EEC) module, reducing the pressure in the closed system to a predetermined initial vacuum level. After the fuel system stabilizes, the pressure within the tank is recorded and then compared with the tank pressure at the conclusion of a predetermined holding interval. If the pressure "bleedup" exceeds predetermined amount, an undesired operational condition of the fuel system may be indicated.

When this evaporative bleedup test is performed at the same time the vehicle is being aggressively driven or is traveling over rough roads, the resulting fuel sloshing within the tank can cause more rapid than usual pressure buildup during the holding interval, and a consequent indication of a condition that does not in fact exist.

SUMMARY OF THE INVENTION

It is accordingly an object of the present invention to perform diagnostic tests of a sealed fuel system without experiencing false indications due to fuel sloshing.

In accordance with the invention, during the holding interval when fuel system pressure is being monitored, a signal indicative of the amount of fuel sloshing present in the fuel system is generated by determining the difference between the instantaneous value of pressure within the system and a rolling average of that pressure. Whenever this difference exceeds a predetermined value, the monitoring process is aborted to inhibit the production of a false condition indication, and the monitoring process is repeated at a later time when excessive fuel sloshing is no longer present.

The improved fuel system test contemplated by the invention is preferably implemented using the vehicle's existing electronic engine control module and the fuel system pressure sensor which is used for other purposes. As a consequence, the benefits of the invention may be obtained at very little additional cost.

These and other features and advantages of the present invention may be better understood by considering the following detailed description of a preferred embodiment of the invention.

During the course of this description, frequent reference will be made to the attached drawings.

DESCRIPTION OF THE PREFERRED EMBODIMENT

Figure 1:
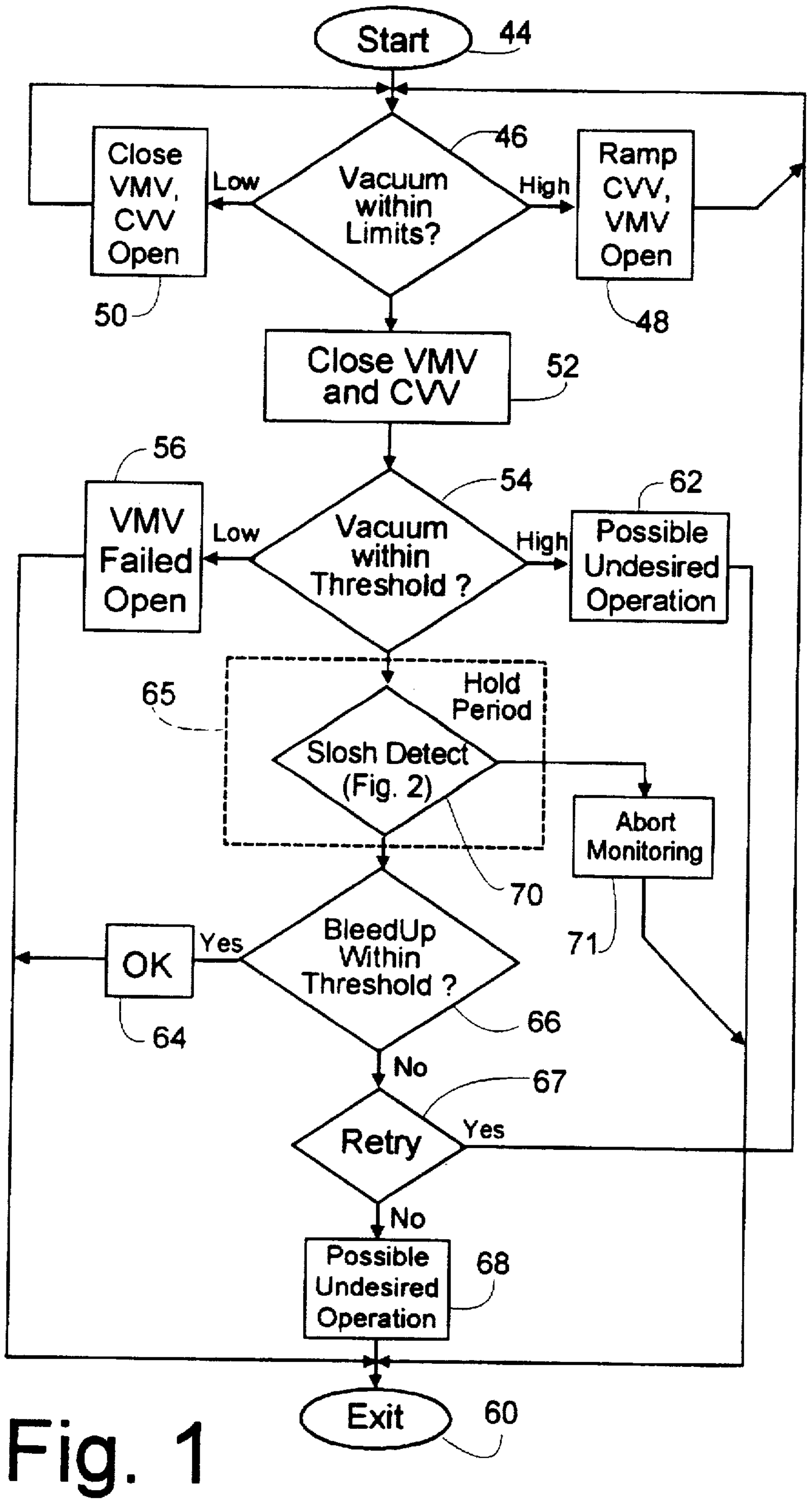
FIG. 1 is a flow diagram illustrating the steps in an automatic on-board fuel system diagnostic process which utilizes the principles of the invention.
Figure 3:
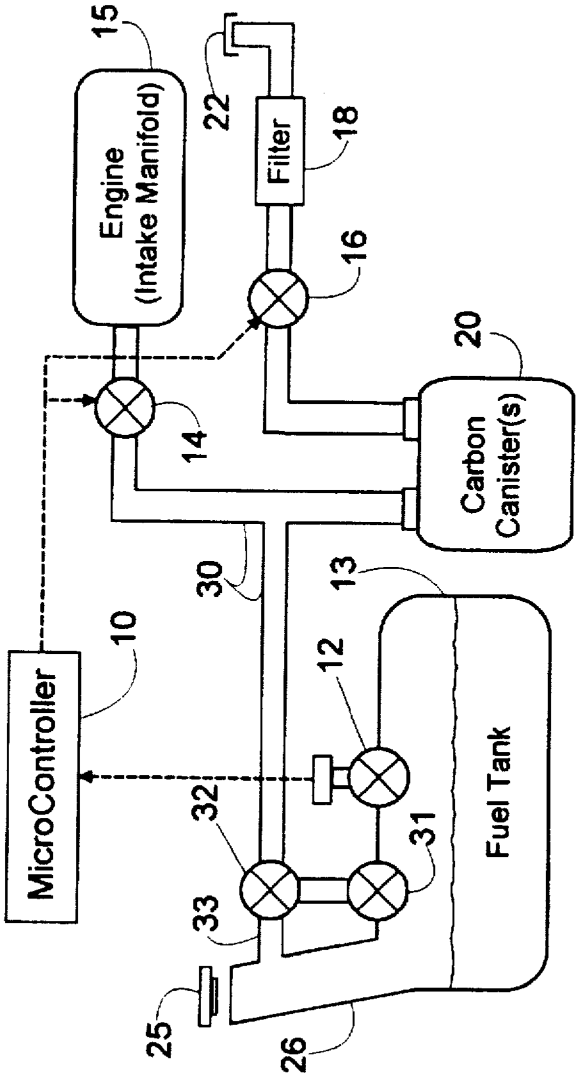
FIG. 3 is a schematic diagram of fuel system monitoring apparatus which employs the invention.

The diagnostic procedure shown in FIG. 1 is performed automatically at predetermined intervals by a micro controller 10 seen in FIG. 3. The controller 10 is connected to a fuel tank pressure transducer 12 which provides signal values indicating the instantaneous pressure of the vapor within a fuel tank 13 at a position above the fuel level. Typically, analog-to-digital conversion units external to, or incorporated within, the microcontroller 10 convert analog signal amplitudes into a sequence of corresponding digital pressure values for processing.

The diagnostic routine depicted in FIG. 1 controls a vapor management valve (VMV) 14 which is positioned between the tank 13 and the intake manifold 15 of the vehicle engine. In addition, the diagnostic routine controls a normally open canister vent valve (CVV) 16 which controls the air flow through a filtered passageway 18 which connects the carbon evaporation canister(s) 20 to an atmospheric vent 22.

The closed fuel system seen in FIG. 3 further includes a vacuum/pressure relief valve within a cap 25 which closes the fuel inlet passageway 26 that extends into the fuel tank 13. A passageway 30 extends from a rollover valve 31 at the top of the tank 13 to both the carbon canister(s) 20 and the VMV 14. A running-loss vapor control valve 32 connects the passageway 30 to the upper portion of the fuel inlet passageway 26 via a branch passageway 33.

The diagnostic technique used to monitor the closed fuel delivery system shown in FIG. 3 is performed as shown in FIG. 1. The diagnostic testing procedure begins at 44 by first establishing that the vacuum within the closed system, as indicated by the signal from pressure transducer seen if FIG. 3, is within predetermined initial limits. If the test performed at 46 reveals that the pressure within the tank 13 is too high, CVV 16 is progressively closed while VMV 14 is kept open at 48 until the pressure decreases below the predetermined initial upper limit. If the tank pressure is below a predetermined initial lower limit (vacuum too high), the VMV 14 is closed and the CVV kept open as indicated at 50 until the tank pressure increases into the acceptable range.

When the initial tank pressure has been established at the desired level, both the VMV and the CVV are closed at 52, sealing the system. The tank pressure is then monitored as indicated at 54. Should an excessively low pressure (high vacuum) be detected, it is known that the VMV valve failed to close properly, a "VMV Failed Open" condition is signaled at 56, and the monitoring process terminates at the exit 60. If the test at 54 indicates that the pressure is too high (not enough vacuum), an undesired operating condition is signaled at 62 and the monitoring process terminates at 60. During the hold period indicated generally at 65, the vacuum level is allowed to stabilize (for about 2 seconds), a tank pressure is recorded, a timed vacuum hold interval (about 10 seconds) is allowed to elapse, and the tank pressure at the end of this hold period is then compared with the recorded reading from the beginning of the vacuum hold interval. The resulting vacuum "bleedup" value (the difference between the two readings) is then compared with predetermined criteria to insure that the operation of the closed system is within prescribed norms. If the bleedup is found to be within proper limits, an "OK" code is produced at 64 indicating that no faults were detected during the course of the diagnostic, and the process exits at 60.

If excessive bleedup is detected, the monitoring system repeats the test when so instructed by the retry step 67, which may direct that a predetermined number of retries be attempted, or that retries be attempted until a predetermined retry interval concludes. If none of the retries are successful, an indication is produced at 68 indicating a possible undesired operational condition in the sealed fuel delivery system.

In practice, it has been found that fuel sloshing within the tank 13 due to aggressive driving or rough roads causes an excessive vacuum bleedup value to be produced, which in turn generates an incorrect indication of an evaporative integrity test failure. As contemplated by the invention, means are employed for detecting fuel sloshing to abort the monitoring process without sending an output condition signal whenever the presence of a high degree of sloshing is detected. The mechanism for detecting sloshing is operative during the vacuum hold period as indicated at 70 in FIG. 1. If sloshing is detected, the monitoring process is aborted (as illustrated at 71) without generating an output indication.

Figure 2:
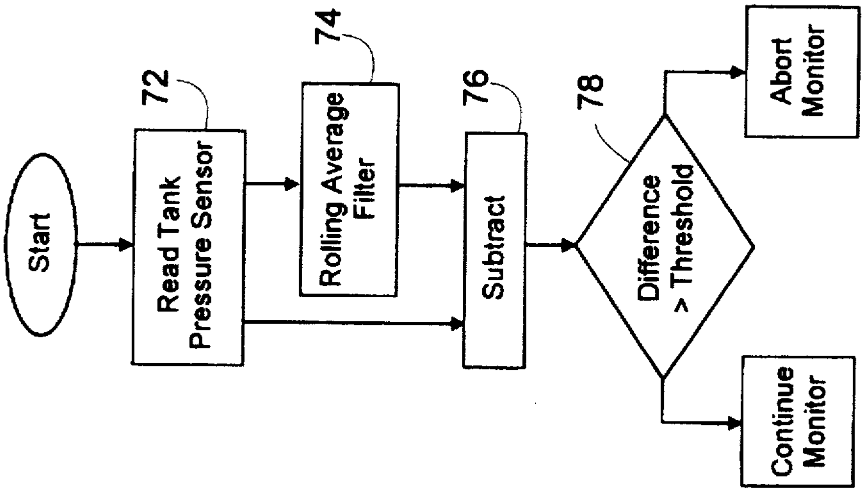
FIG. 2 is a flow diagram illustrating the steps used to detect the presence of excessive fuel sloshing as contemplated by the invention.

The preferred fuel sloshing detection technique is depicted in detail in FIG. 2. The procedure obtains pressure readings at 72, forms a rolling average of the pressure readings at 74, and, at 76, compares the instantaneous pressure reading from 72 with the rolling average from 74. The rolling average value filter 74 preferably comprises means for accumulating a total value by summing the sequence of instantaneous pressure values from the sensor, and dividing this total value by a count value indicating the number of instantaneous values summed.

If the difference between the resulting rolling average value and any instantaneous value is greater than a predetermined threshold value as determined by the test at 78, excessive fuel sloshing which may compromise the test is indicated and the monitoring process is aborted.

The microcontroller 10 which performs the above-noted signal processing steps preferably takes the form of the electronic engine control (EEC) microcontroller used for fuel rate control and other functions. The fuel system test disclosed above may be carried out at timed intervals established by background processing within the EEC system. Since the fuel sloshing detection scheme requires no additional sensors or signal processing instrumentalities beyond those available for other uses within the EEC module, the improved performance achieved by adding the functionality contemplated by the invention is obtained at very low cost.

It is to be understood that the embodiment of the invention described above is merely illustrative on one application of the principles of the invention. Numerous modifications may be made to the methods and apparatus described without departing from the true spirit and scope of the invention.

What is claimed is:

1. Apparatus for detecting fuel sloshing in a sealed vehicle fuel supply system comprising:

means for detecting the instantaneous vapor pressure within said sealed system at a position above the level of fuel in said system, means for generating a sequence of pressure signal values each indicating the magnitude of said instantaneous vapor pressure at one of a plurality of spaced time intervals, means for generating an average signal value indicative of an average of a plurality of said pressure signal values, means for generating a deviation signal value indicative of the difference between one of said pressure signal values and said average signal value, and means responsive to said deviation signal for producing an indication of the amount of fuel sloshing in said sealed fuel system.

2. Apparatus for detecting fuel sloshing as set forth in claim 1 wherein said means for generating said average signal comprises a digital rolling average filter comprising means for accumulating a total value representing the sum of said plurality of pressure signal values and means for dividing said total value by the number of pressure signal values included in said sum.

3. Apparatus for detecting fuel sloshing as set forth in claim 1 wherein said means for producing an indication of the amount of fuel sloshing comprises threshold means for comparing said deviation value with a predetermined threshold level and producing said indication of fuel sloshing whenever said deviations signal exceeds said predetermined threshold level.

4. Apparatus as set forth in claim 3 further including valve means for controlling the vapor pressure within said sealed fuel supply system and means for controlling said valve means to establish an initial pressure level within said system prior to the generation of said sequence of pressure values.

5. Apparatus for detecting leaks in a sealed vehicle fuel supply system while the vehicle is being driven, the apparatus comprising, in combination, a pressure sensor for generating a signal value indicative of the instantaneous pressure within said sealed vehicle fuel supply system while the vehicle is being driven, at least one valve for controlling the magnitude of pressure within said sealed system while the vehicle is being driven, and a programmed electronic engine controller connected to said pressure sensor and to said valve, said controller comprising, in combination, first processing means responsive to said pressure sensor for operating said valve to establish an initial pressure within said sealed system, second processing means responsive to said pressure sensor for generating an undesired operational indication whenever said instantaneous pressure deviates from said initial pressure by more than a first predetermined amount within a test interval that has a predetermined duration and that occurs while the vehicle is being driven, third processing means responsive to said pressure sensor for forming a rolling average of said instantaneous pressure while the vehicle is being driven, and fourth processing means for disabling said second processing means to prevent the generation of said undesired operational indication whenever said instantaneous pressure differs from said average by more than a second predetermined amount.

6. Apparatus as set forth in claim 5 wherein said second predetermined amount has a magnitude indicative of fuel sloshing within said sealed system sufficient to cause a rapid evaporative pressure loss sufficient to produce a false indication.

7. Apparatus as set forth in claim 6 including means for generating an undesired operational indication whenever the initial pressure established by said first processing means is outside a predetermined range of acceptable initial pressure values.

8. Apparatus for detecting excessive fuel sloshing in a sealed vehicle fuel supply system in a vehicle provided with a microcontroller for controlling the amount of fuel delivered to an internal combustion engine, said apparatus operating while the vehicle is being driven and said apparatus comprising:

sensing means connected to said microcontroller for producing a sequence of digital signal values indicating the instantaneous vapor pressure within said sealed fuel supply system while the vehicle is being driven, a first control program executable by said microcontroller for dividing the arithmetic sum of said sequence of digital values by the number of said digital values to produce a rolling average value, a second control program executable by said microcontroller for subtracting each of said digital values from said rolling average to produce a deviation value, and a third control program executable by said microcontroller for producing an indication of excessive fuel sloshing whenever aid deviation value is larger than a predetermined threshold value.

9. Apparatus as set forth in claim 8 further including a fourth control program executable by said microcontroller for periodically processing said sequence of digital values to detect pressure changes in said fuel system indicative of trouble conditions in said fuel system, and means for preventing said fourth control program from detecting said trouble conditions whenever said third said indication of excessive fuel sloshing is produced.

10. Apparatus as set forth in claim 9 further including means for initiating the operation of said first, second, third and fourth control program at periodic intervals.

* * * * *